US006594562B2

(12) United States Patent
Kaiser et al.

(10) Patent No.: US 6,594,562 B2
(45) Date of Patent: Jul. 15, 2003

(54) DIAGNOSTIC METHOD FOR VEHICLE EVAPORATIVE EMISSIONS

(75) Inventors: Jeffrey Kaiser, Milford, MI (US); Allen Joseph Lehmen, Dearborn Hgts, MI (US); Timothy Gernant, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/731,939

(22) Filed: Dec. 7, 2000

(65) Prior Publication Data

US 2002/0116102 A1 Aug. 22, 2002

(51) Int. Cl.$^{7}$ .......................... F02M 33/02; G06F 7/00
(52) U.S. Cl. .......................... 701/29; 123/518
(58) Field of Search .......................... 701/29; 73/49.2, 73/49.7, 118.1; 123/516, 518, 519, 520

(56) References Cited

U.S. PATENT DOCUMENTS

| | | | | | |
|---|---|---|---|---|---|
| 5,333,590 | A | * | 8/1994 | Thomson | 123/198 D |
| 5,490,414 | A | | 2/1996 | Durschmidt et al. | |
| 5,878,727 | A | | 3/1999 | Huls | |
| 6,016,690 | A | | 1/2000 | Cook et al. | |
| 6,321,727 | B1 | * | 11/2001 | Reddy et al. | 123/520 |

FOREIGN PATENT DOCUMENTS

EP 0 611 674 A1 8/1994

* cited by examiner

*Primary Examiner*—Michael J. Zanelli
(74) *Attorney, Agent, or Firm*—Carlos L. Hanze

(57) ABSTRACT

A method of monitoring evaporative emissions of a vehicle includes the steps of establishing a baseline pressure within a vehicle evaporative emission system during the occurrence of a vehicle-off condition, detecting a change in the baseline pressure during the vehicle-off condition, and indicating whether the change in the baseline pressure is within a desirable limit.

17 Claims, 9 Drawing Sheets

DIAGNOSTIC METHOD FOR VEHICLE EVAPORATIVE EMISSIONS

BACKGROUND OF THE INVENTION

1. Field of the Invention

The present invention relates generally to evaporative emission control in motor vehicles. More particularly, the invention relates to a diagnostic method for monitoring an evaporative emission system of a motor vehicle.

2. Background Art

Conventional motor vehicles are well known to release evaporative hydrocarbons into the atmosphere during both operating and non-operating states of the vehicle. Consequently, laws and regulations have been established requiring on-board vehicle evaporative emission systems to control the amount of fuel vapors emitted into the atmosphere. Such systems typically include a carbon filled canister and one or more valves for collecting, routing and venting unburned hydrocarbon emissions.

To monitor the level of hydrocarbon emissions from such systems, so-called On-Board Diagnostics (OBD) systems are used to insure that a vehicle's evaporative emission system and powertrain components are operating in compliance with government standards. Conventional diagnostic systems, including OBD systems, utilize pressure or vacuum tests to monitor hydrocarbon emissions. Generally, these systems apply a partial vacuum to the fuel tank of the vehicle until a predetermined pressure level is reached. Once the predetermined pressure level is reached, the tank is sealed and the system measures the amount of vacuum "bleed off" over a predetermined period of time. An example of one such diagnostic system is described in U.S. Pat. No. 5,261,379 to Lipinski et al., which is also owned by the assignee of the present application.

Conventional diagnostic systems require that diagnostic tests be performed while the vehicle is running and in an operative state. Consequently, changing environmental and operating conditions tend to affect a system's detection of low-level hydrocarbon emissions. Significant factors that may be considered include fuel "sloshing", changes in fuel temperature and barometric pressure, heat introduced by circulated fuel, fuel evaporative characteristics, tank flex, the age of the fuel, and ambient or underbody air temperature.

Fuel sloshing can occur during idle conditions (fuel circulation due to fuel pump), steady state operation (small agitation), or during stopping, starting and braking conditions (large agitation). As the fuel sloshes within the tank, the chemical reactions that produce fuel vapor occur at a faster rate thus increasing the gas volume and pressure inside the fuel tank. Also, as cooler "sloshing" liquid fuel comes into contact with warmer tank surfaces, the resulting temperature differential enhances the rate of fuel vaporization and thus fuel tank pressure. Consequently, since typical fuel tank pressures are measured on the order of inches of water, even the smallest changes in fuel tank pressure can influence the results of an emissions detection evaluation.

Another factor relates to the effect of external pressure changes on the pressure sensors used in conventional systems. Because conventional systems use sensitive gage pressure sensors that measure differences between a pressure/vacuum source and a reference source, typically the atmosphere, such systems are susceptible to small variations in fuel vapor pressure attributable to movement of the vehicle. Normal changes in atmospheric pressure are approximately equal to one inch of mercury per 1000 feet of elevation, or 1.36 in of water per 100 feet of elevation. For example, if a vehicle were traveling up or down a hill with a 5% grade at 60 mile per hour, the elevation would change 264 feet every 60 seconds and thus the atmospheric reference pressure would change by 3.59 inches of water every 60 seconds. Therefore, if the atmospheric reference source changes so does the relative measurement of the pressure/vacuum source.

Other limiting factors include fuel temperature effects related to the proximity of the fuel tank to the vehicle's exhaust system and whether the vehicle has a so-called "return" or "returnless" fuel system.

SUMMARY OF THE INVENTION

A method is provided for monitoring evaporative emissions from a vehicle having an evaporative emission system, the method including the steps of: establishing a baseline vapor pressure within the evaporative emission system during a vehicle-off; detecting a change in the baseline vapor pressure during the vehicle-off condition; and indicating whether the change in the baseline vapor pressure is within a desirable limit. In accordance with the present invention, a "vehicle-off" condition is defined as a mode wherein the vehicle is stationary with the internal combustion engine turned off. To implement the method, a corresponding system is also disclosed, the system having a sensor for monitoring a baseline vapor pressure of the evaporative emission system and subsequent changes thereto occurring during a vehicle-off condition, and a controller activateable during the vehicle-off condition and coupled to the evaporative emission system and the sensor for indicating whether the change in the baseline vapor pressure is within a desirable limit.

An advantage of the above-described diagnostic method and corresponding system is that vehicle evaporative emissions can be detected while the vehicle is in an engine-off condition, thereby substantially eliminating sources of undesired pressure disturbances, such as fuel slosh, temperature gradients, barometric pressure changes, etc. By performing a diagnostic test while the engine is off and after it has been stationary for a predetermined period of time, pressure disturbances are significantly reduced thereby enabling accurate and repeatable detection of lower-level hydrocarbon emissions.

Further objects, features and advantages of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
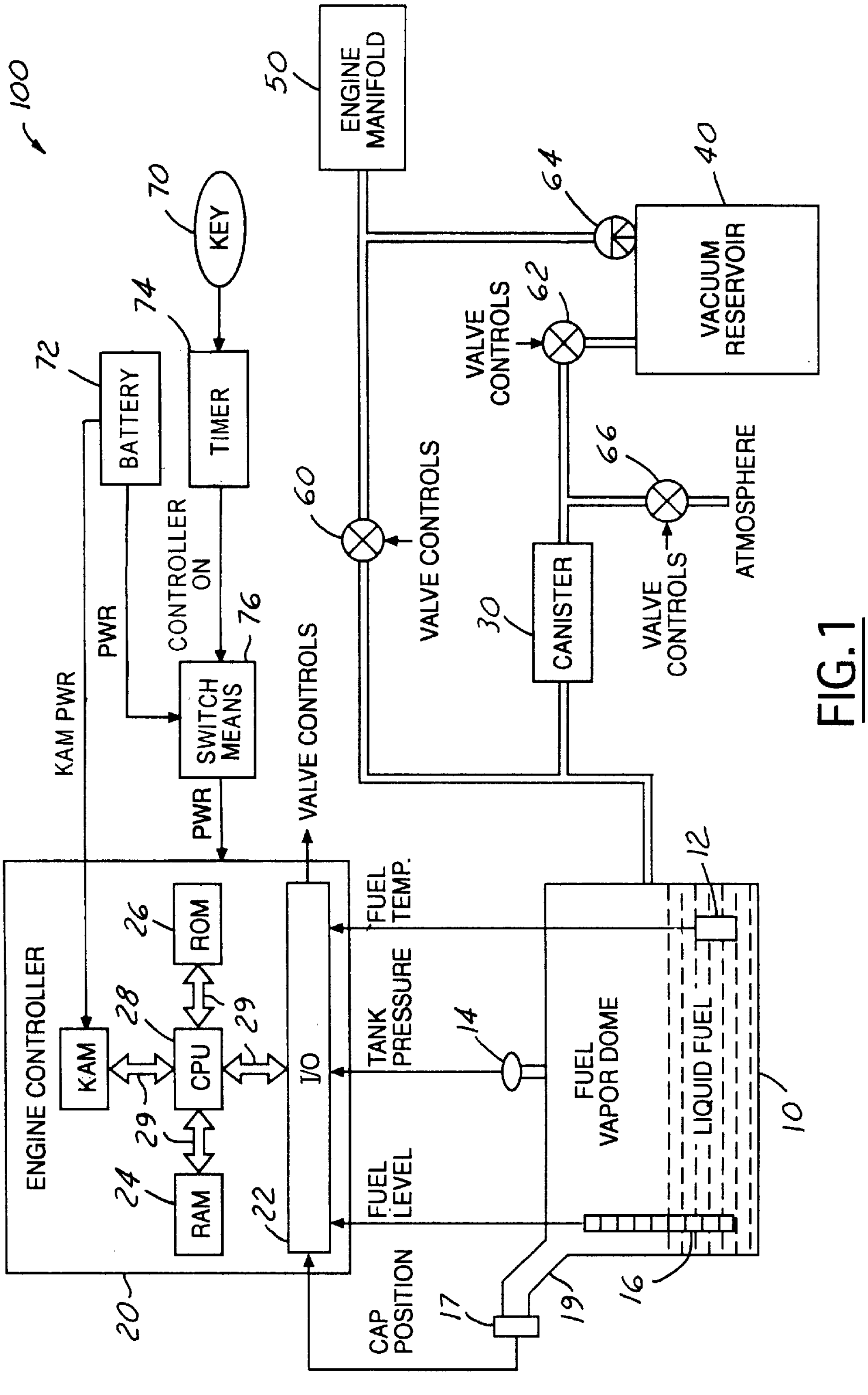
FIG. 1 is a schematic diagram of a vehicle evaporative emissions system according to a preferred embodiment of the present invention.

FIG. 1 is a schematic block diagram of a vehicle evaporative emissions system in accordance with a preferred embodiment of the present invention. The system 100 includes a fuel tank 10 mechanically coupled to an evaporative emissions canister 30, a vacuum reservoir 40 and an engine intake manifold 50. The evaporative emission canister 30, as known and understood in the art, includes one or more fuel vapor adsorbing materials such as activated carbon particles for preventing the release of hydrocarbons into the atmosphere. The vacuum reservoir 40 is used to retain vacuum that is used to perform the diagnostic method of the present invention when the vehicle is in an off-condition. Preferably, the reservoir is sized such that the diagnostic test can be performed using a minimum fuel level of 15%. The system also includes a fuel tank pressure transducer 14 for determining the instantaneous pressure of the fuel tank vapor dome inside the fuel tank 10, and a fuel tank temperature sensor 12 for determining the temperature of the liquid fuel inside the tank 10. A fuel tank fill gauge 16 is also provided for indicating the liquid fuel level inside the tank 10.

As further shown in FIG. 1, the evaporative emission system further includes a controller 20 electrically coupled to a power switch 76, itself being coupled to a timer 74 and battery or other suitable power source 72. Power switch 76 and timer 74 can be external hardware and/or software elements as shown in FIG. 1, or integrated as part of the controller 20 hardware and/or software. The controller 20, which can be any suitable engine controller or separate microprocessor-based module, includes a central processing unit (CPU) 28, corresponding input/output ports 22, read-only memory (ROM) 26 or equivalent electronic storage medium containing processor-executable instructions and database values, random-access memory (RAM) 24, "keep-alive" memory (KAM) 27, and a data bus 29 of any suitable configuration. The controller 20 receives signals from a variety of sensors coupled to the engine and/or the vehicle, including but not limited to signals from the fuel tank pressure transducer 14, the fuel tank temperature sensor 12 and the fuel tank fill gauge 16.

The controller 20 is operated as follows to perform the diagnostic method of FIGS. 4 through 7. At a first predetermined time after engine shut-off, as determined by the timer 74, the power switch 76 is activated so as to close the electrical circuit between the controller and battery, thus activating the controller and initiating the diagnostic test. The timer 74 can be activated, for example, in response to the position of a vehicle key 70 or vehicle ignition switch as commanded by an operator. After a waiting period, the switch 76 is thrown into the closed position thus providing power to the controller 20. After the controller 20 is activated, the diagnostic tests of FIGS. 4 through 7 are initiated and measurements taken from the fuel tank pressure transducer 14, the fuel tank temperature sensor 12 and the fuel tank fill gauge 16.

The controller 20 also operates the control valves 60, 62, and 66 of the evaporative emission system. In a preferred embodiment, the control valves include a vacuum release valve 62, a canister vent solenoid 66 and a vapor management valve 60. A mechanically actuated check valve 64 is also provided for establishing a desired vacuum in the vacuum reservoir 40. As shown, the vacuum release valve 62 is normally closed and used for isolating the vacuum reservoir from the fuel system until the system is ready to perform the diagnostic tests described below with reference to FIGS. 4 through 7. The canister vent solenoid 30 is normally open and used for venting the evaporative emission system to atmosphere through the evaporative emission canister 30. Check valve 64 is used for retaining vacuum in the vacuum reservoir 40 created by the engine manifold vacuum source 50. Vapor management valve 60 is normally closed and used for delivering fuel vapor to the engine manifold 50 when requested by the controller 20. The vapor management valve 60 is also used for isolating the evaporative emission system from the engine during the above-mentioned diagnostic method.

Figure 2:
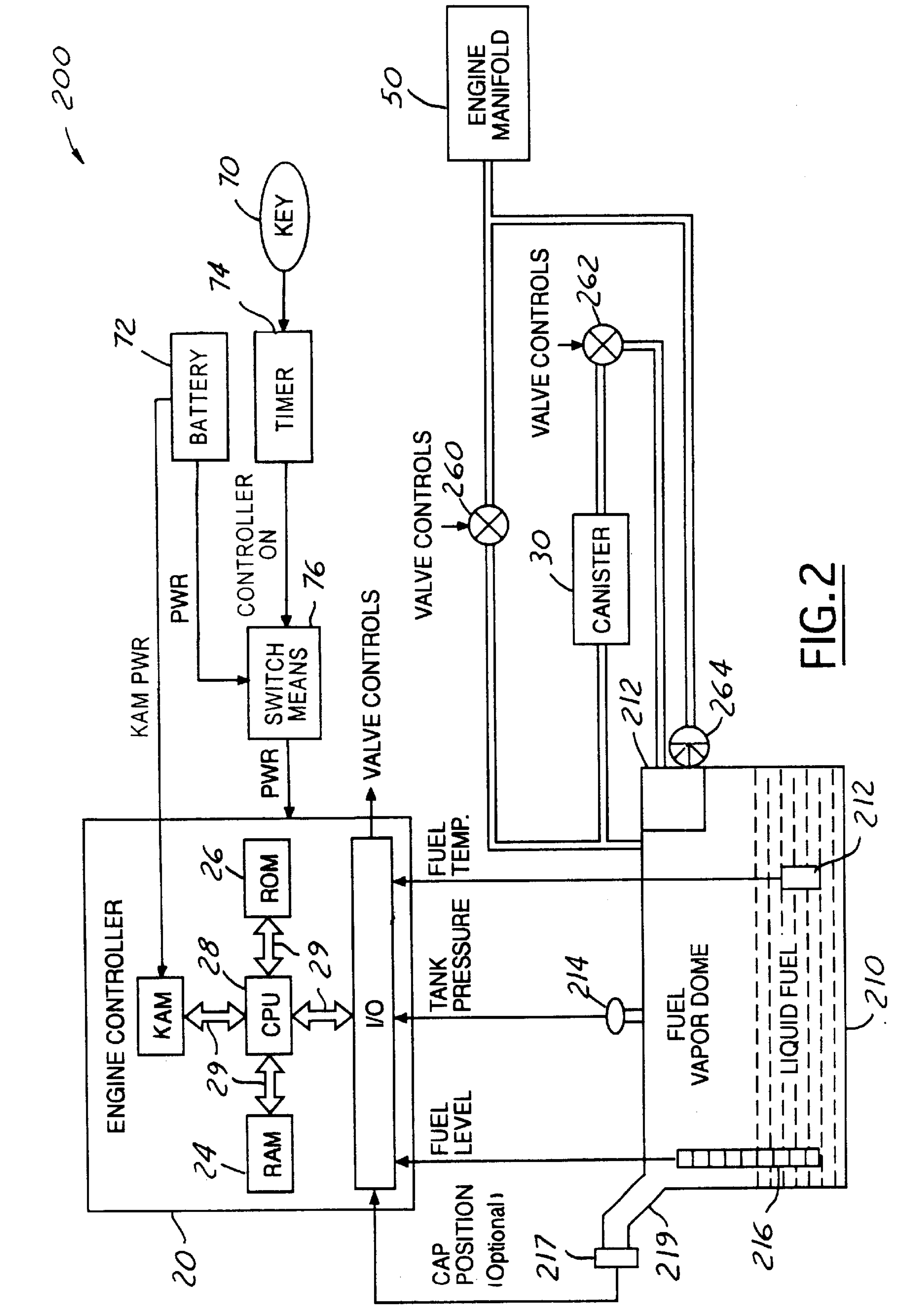
FIG. 2 is a schematic diagram of an evaporative emissions system according to another preferred embodiment of the present invention.
Figure 3:
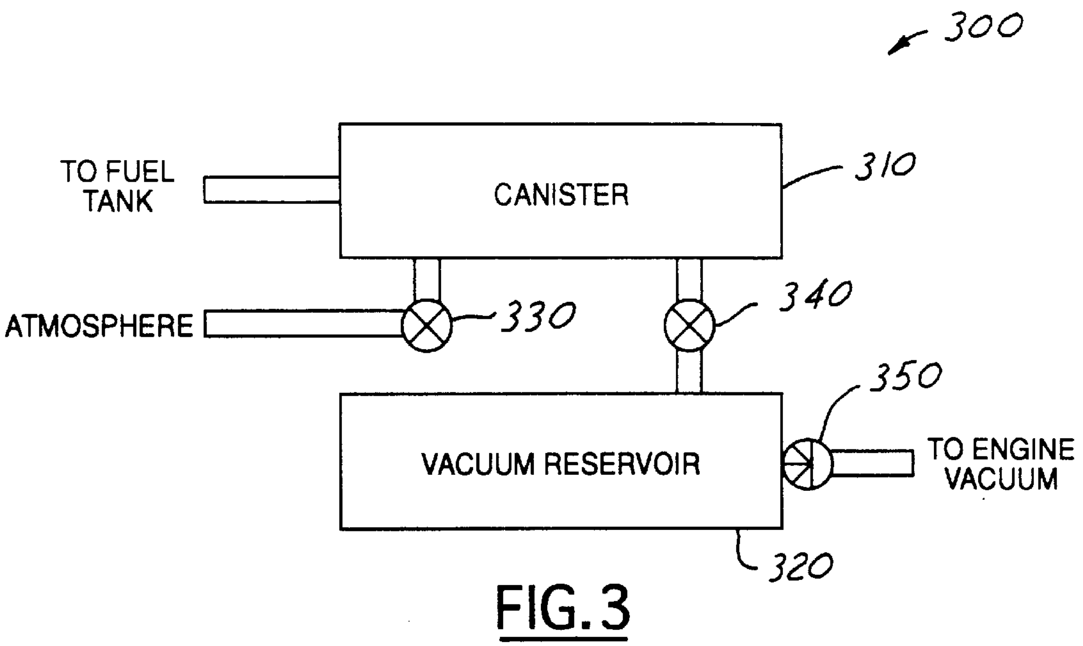
FIG. 3 is a schematic diagram of a combined canister/vacuum reservoir/valve assembly for use with the evaporative emission system of FIG. 1.

FIGS. 2 and 3 show alternative embodiments of the evaporative emission system used for performing the diagnostic method of the present invention. FIG. 2 shows a system similar to the one of FIG. 1 except that the vacuum reservoir 212 (40 in FIG. 1) is molded into fuel tank 210 (10 in FIG. 1). By molding the vacuum reservoir 212 directly into the fuel tank 210, the overall complexity and cost of the evaporative emission system is reduced. FIG. 3 shows a schematic diagram of a combined canister/vacuum reservoir/valve assembly 300 for use with the evaporative emissions system of FIG. 1. The assembly 300 also combines the vacuum release valve 340, canister vent solenoid 330 and check valve 350 (valves 62, 66 and 64, respectively of FIG. 1) to reduce the number of hoses and connections of the system thus reducing system complexity and simplifying overall system assembly.

In still a further embodiment, a vacuum pump is used in lieu of a vacuum reservoir in vehicles where packaging of the reservoir is not feasible, or where the vehicle powertrain does not operate a corresponding internal combustion engine frequently enough to generate the necessary vacuum. An example of such a powertrain is a hybrid vehicle powertrain wherein one or more electric motors are operated together with an internal combustion engine.

Figure 4:
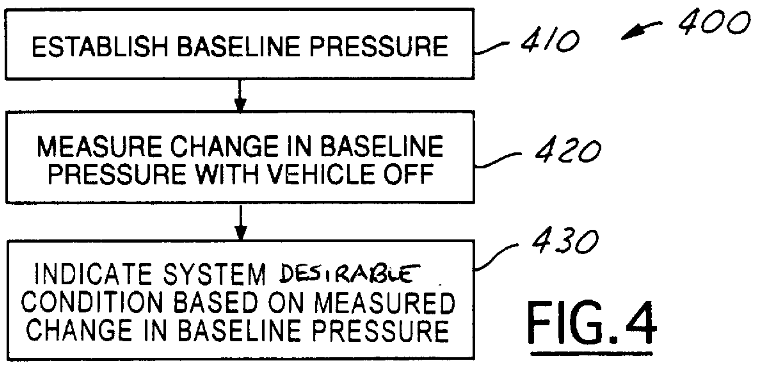
FIG. 4 is a flow diagram of a preferred method for monitoring vehicle evaporative emissions in accordance with the present invention.

FIG. 4 shows a flow diagram of a preferred method for monitoring evaporative emissions in accordance with the present invention. The method, which is executed by a microprocessor-based controller having suitable computer-readable program code, includes the steps of establishing a baseline pressure within a vehicle evaporative emission system during the occurrence of a vehicle-off condition, step 410, detecting a change in the baseline pressure during the vehicle-off condition, step 420, and indicating whether the change in the baseline pressure is within a desirable limit, step 430.

Figure 5A:
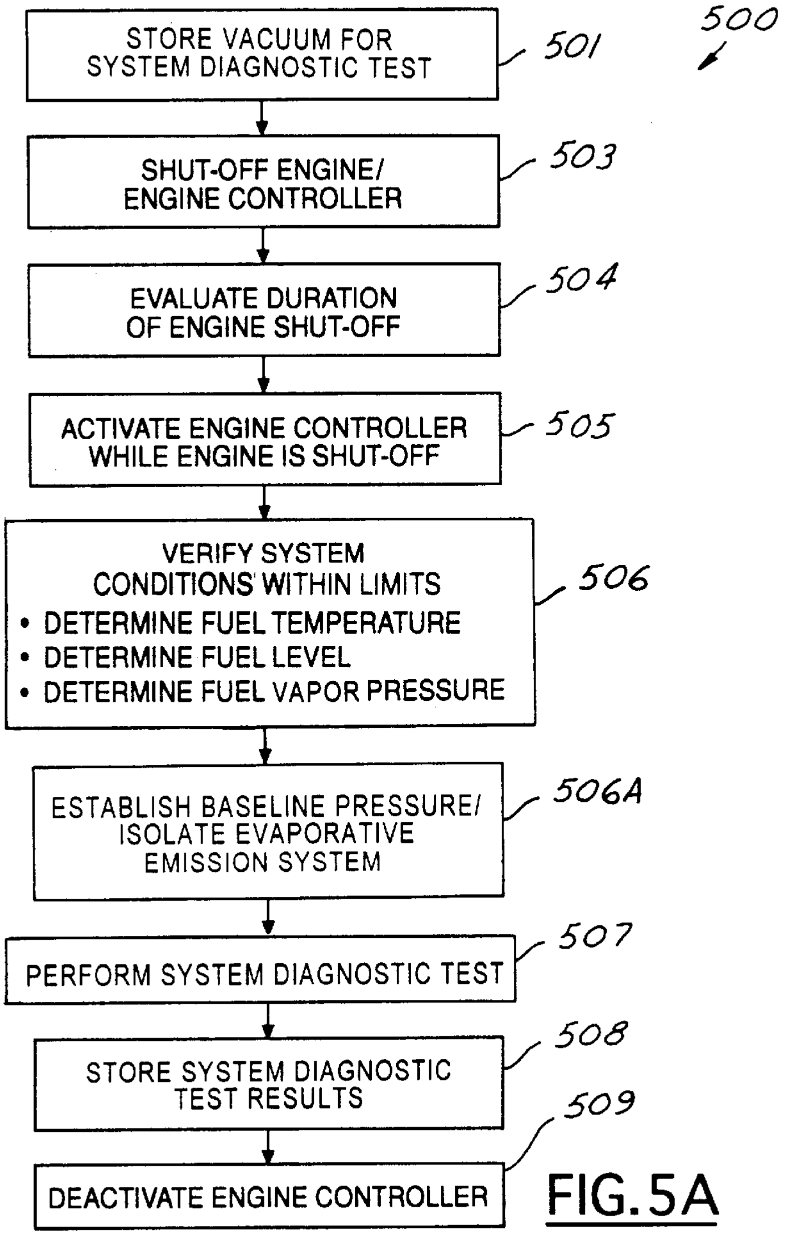
FIG. 5A is a flow diagram of a diagnostic method for monitoring vehicle evaporative emissions in accordance with a preferred method of the present invention.

FIG. 5A shows a detailed flow diagram of a diagnostic method of FIG. 4. The method first includes creating a desired pressure within a vehicle evaporative emission system, step 501, preferably by storing a vacuum, to be used later for establishing a system baseline pressure and performing a system diagnostic test. Referring also to FIG. 1, the vacuum automatically is stored by the check valve 64 such that a portion of the vacuum generated by the engine manifold vacuum source 50 is retained in the vacuum reservoir 40.

A "vehicle-off" condition is then established, step 503, by shutting-off the vehicle's internal combustion engine (including controller) thus leaving the vehicle stationary and "at rest". Nominally, the vehicle must be in an off condition for a predetermined period of time before the system test is performed. Because the emissions evaluation test is performed while the vehicle is off and stationary, pressure disturbances attributable to liquid fuel slosh and fuel agitation are minimized.

While the engine is in an off condition, a timer or equivalent circuit tracks and evaluates the duration of engine shut-off, step 504, until a required amount of time has elapsed prior to the system test. After the predetermined period of time has elapsed, nominally 5 to 6 hours, the controller is activated, step 505, and a check of system conditions is performed, step 506, to determined whether the system test is to be performed, step 507. Thus, the primary functions of the controller 20 are to: (1) enable the required vehicle hardware and software to perform an initial check of system conditions prior to the system test, step 506; (2) perform the system test itself, step 507; and (3) store the results of the system test, step 508.

In accordance with step 506 of FIG. 5A, the initial check of system conditions includes but is not limited to determining the temperature of the liquid fuel inside the fuel tank, determining the amount of liquid fuel inside the fuel tank, and determining the initial fuel vapor pressure inside the vehicle fuel tank. Fuel temperature, fuel level and fuel vapor pressure are determined using any suitable sensors as known and appreciated in the art. Preferably, the present system utilizes an in-tank fuel temperature sensor so as to minimize external environmental effects due to heated asphalt, concrete and the like.

Optionally, to improve the reliability of the diagnostic method, a step is described for determining whether or not the fuel inside the tank has sufficiently vaporized prior to performance of a system diagnostic test. A related "fuel weathering" method is described below in detail with reference to FIGS. 7A and 7B.

Referring again to FIG. 5A, a baseline pressure is created in the evaporative system by releasing the vacuum stored in the vacuum reservoir, step 506A. The system is at the same time isolated from atmospheric conditions and the remainder of the vehicle fuel system until such time a system diagnostic test is performed. Step 506A is accomplished, for example, by opening the vacuum release valve 62 as described above until the baseline pressure is established in the system.

Next, the method of FIG. 5A includes the step of performing a system diagnostic test 507 by measuring a change in the baseline pressure while the vehicle is in the off condition, and the step of indicating whether the change in pressure is within a desirable limit, step 508. In accordance with a preferred embodiment, the system is held at a baseline pressure and is allowed to "bleed up" during a predetermined delta pressure time depending upon fuel temperature and fuel fill level. Test results and environmental conditions are then stored in computer memory, step 507, and the controller deactivated, step 508.

Figure 5B:
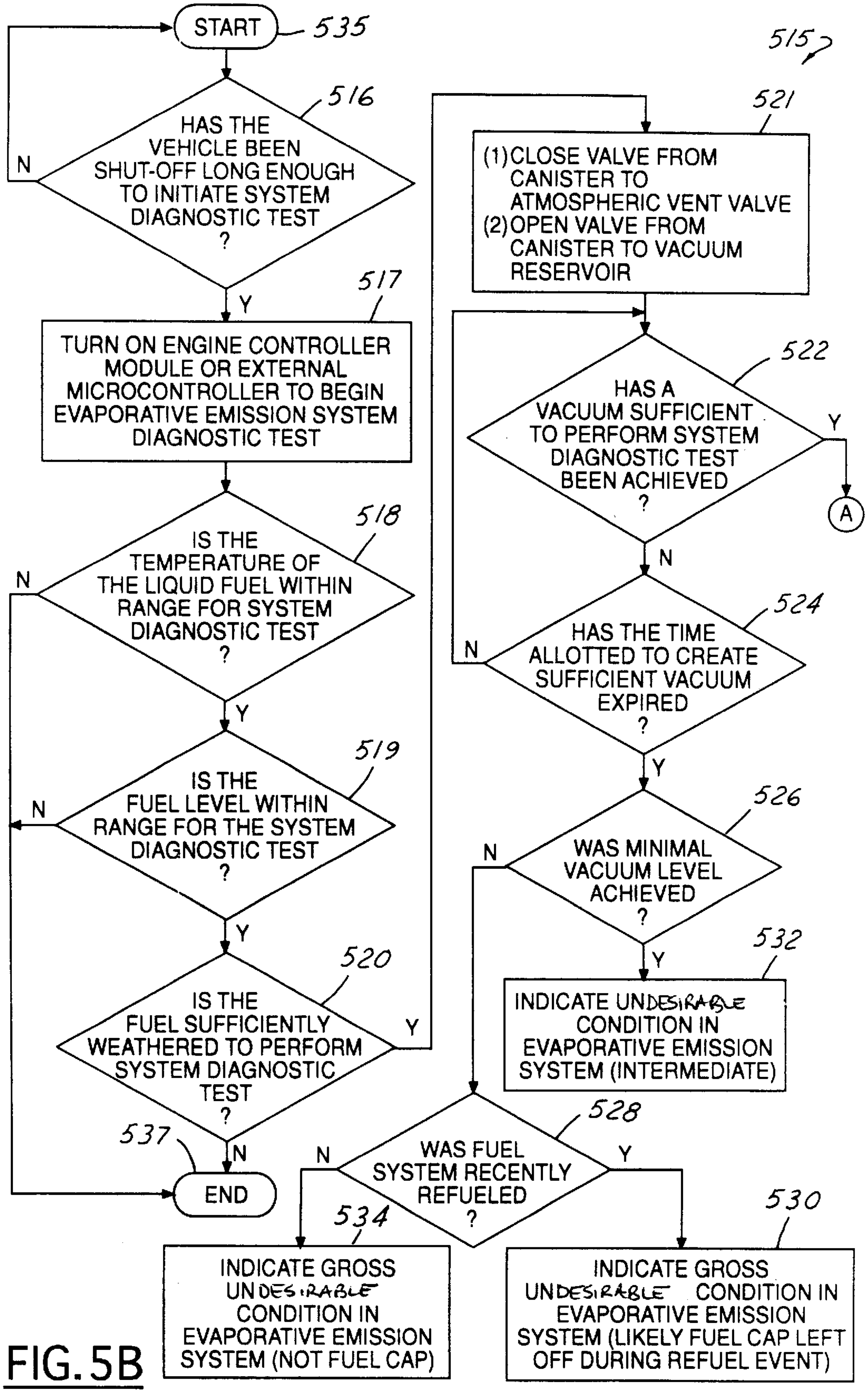
FIGS. 5B and 5C are further detailed flow diagrams of the diagnostic method of FIG. 1.
Figure 5C:
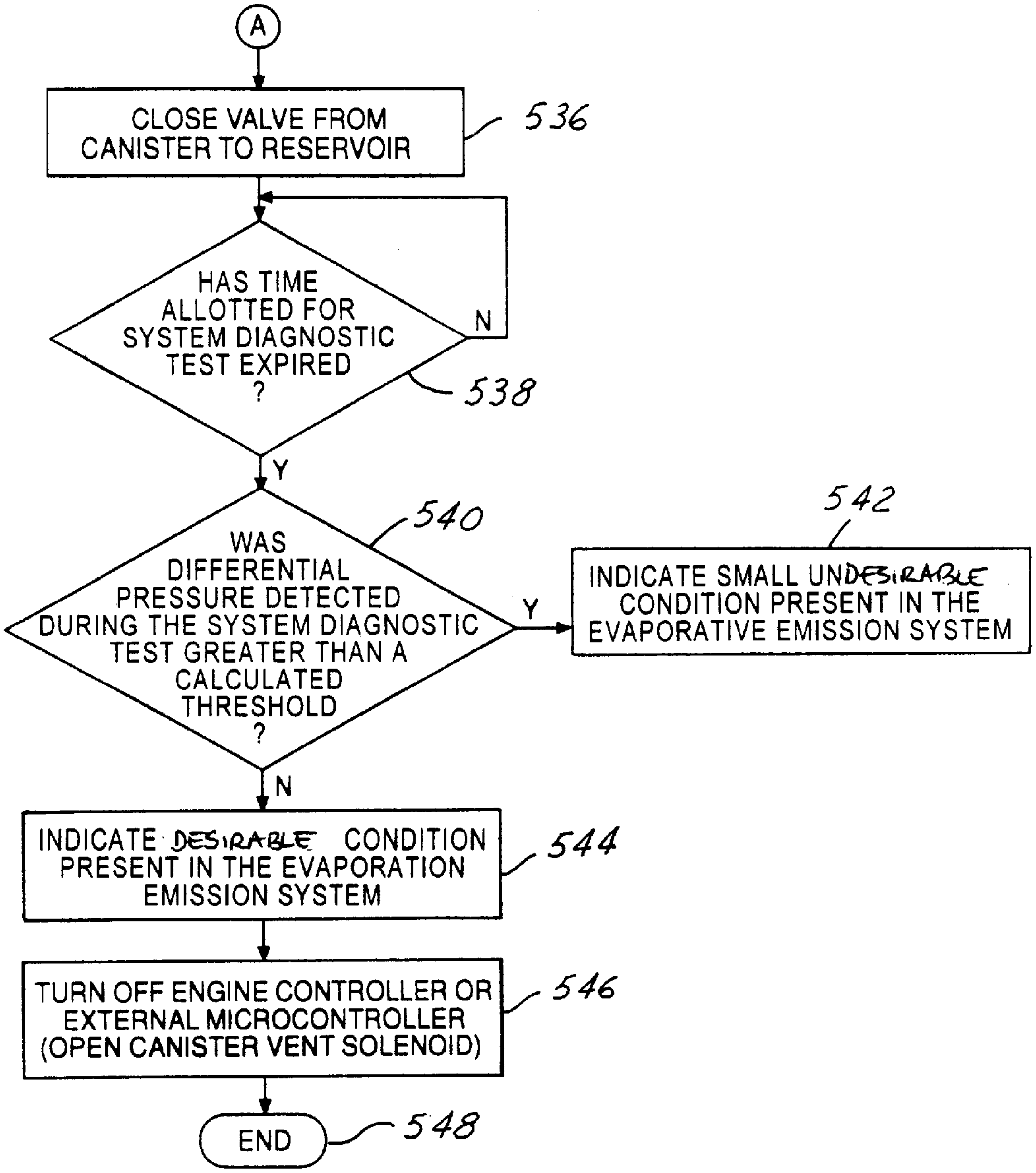

Referring now to FIGS. 5B and 5C, a detailed diagnostic method is described for monitoring emissions from a vehicle evaporative emission system as shown in FIG. 1. Initially, as shown in FIG. 5B, a check is made to determine how long the vehicle has been dormant, i.e., in a "soaked" or "vehicle-off condition", step 516. If the vehicle has been soaked for a sufficient period of time, then the controller is powered-up and initialized, step 517. Once the controller has been initialized, checks 518, 519 and 520 are then performed to make sure that proper conditions exist for the system diagnostic test to begin. These checks include determining whether fuel temperature, fuel level and fuel weathering are within the proper limits prior to performance of the system diagnostic test. If any of these conditions are determined to be outside prescribed limits, then the system test will be bypassed and will not be re-initiated until the vehicle is driven again, step 537.

If the system is deemed suitable for the system test, the canister vent solenoid 66 of FIG. 1 is closed and the vacuum release valve 62 is opened, step 521. As such, the evaporative emission system is isolated from atmosphere and a vacuum condition is created throughout the evaporative emission system. If a required vacuum condition, nominally 8 to 10 inches of water, is not detected by the fuel tank pressure transducer 14 within a prescribed period of time, steps 522 and 524, then the system emissions are deemed to be "intermediately" or "grossly" outside desirable limits, steps 526 and 528. The system is intermediately outside limits if the measured vacuum is equal to or greater than a minimum vacuum level, the minimum vacuum level being dependent on fuel system properties such as the size of the fuel tank and material(s) comprising the fuel tank. If the measured vacuum falls short of the minimum vacuum level, then system is evaluated to determine whether the vehicle was recently refueled, step 528. If the vehicle was recently refueled, then the system is considered to be grossly outside limits, step 534, due to the fuel cap being left off after a refueling event. Otherwise, the system is simply considered to be grossly out of limits, step 530. Whether the vehicle has been refueled can be determined by monitoring sudden increases in fuel level, or alternatively by electronically monitoring the opening and closing of the vehicle fuel cap.

Referring now to FIG. 5C, if instead a sufficient vacuum is detected by the fuel tank pressure transducer 14, then the vacuum release valve 62 is closed and the system diagnostic test is initiated, step 536. Based on both the fuel tank level and fuel liquid temperature, an optimal duration for the system test is generated by the controller. At higher fuel levels, the system diagnostic test duration is shorter; at lower fuel levels the duration is longer. Likewise, for larger-size fuel tanks the duration is longer; for smaller-size fuel tanks the duration is shorter. During the test, the system remains isolated from atmosphere by the vapor management valve 60 and the canister vent solenoid 66 until the test duration expires, and the fuel tank pressure transducer 14 is used to derive a differential pressure occurring during the test period. The differential pressure is understood to be the difference between the pressure of the system at the end of the test and the pressure of the system at the beginning of the test.

Figure 6:
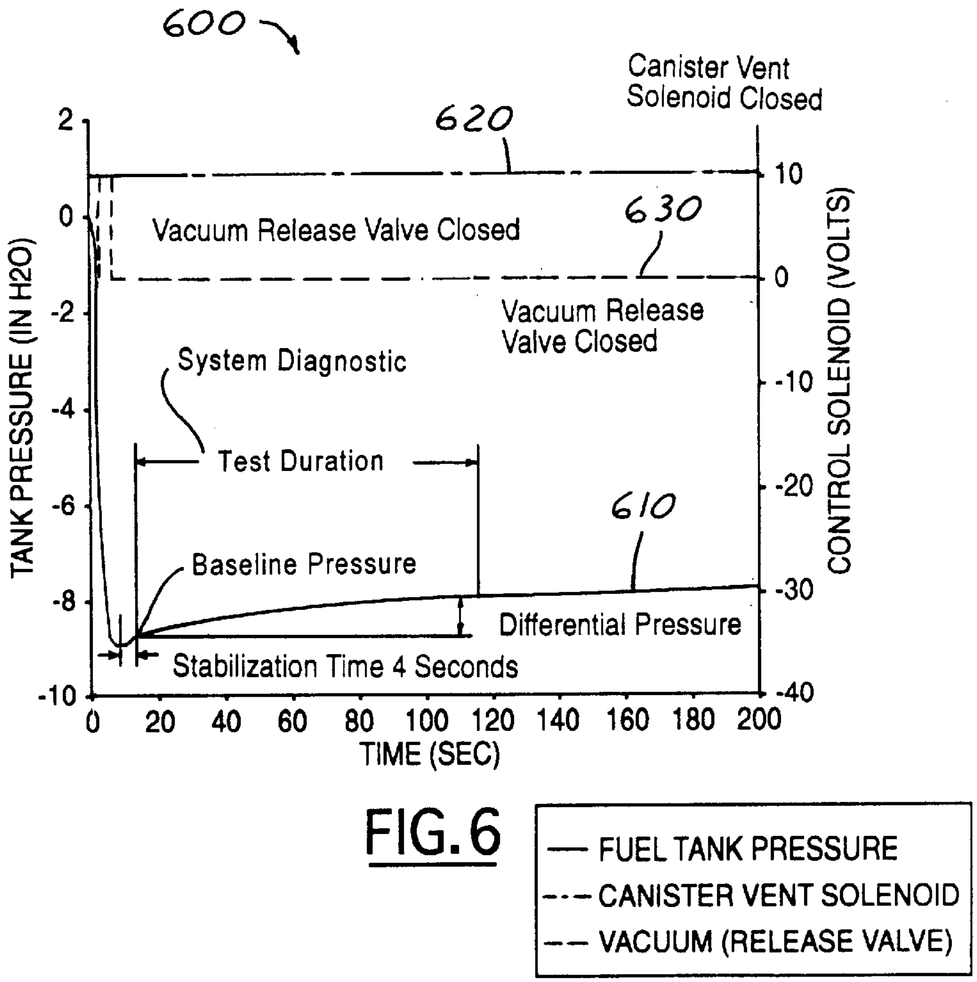
FIG. 6 is a timing diagram of a system test for the evaporative emission system of FIG. 1.

FIG. 6 shows a timing diagram of a system diagnostic test corresponding to the method of FIGS. 5B and 5C. The timing diagram corresponds to a system having a full tank. At time t=0 corresponding to a time after the engine has been off for a predetermined period of time, the canister vent solenoid is closed and the vacuum release valve is temporarily opened. Events associated with the canister vent solenoid and vacuum release valve are indicated by curves 620 and 630. Stored vacuum is released into the system, and after a stabilization period, shown nominally as 4 seconds, a baseline pressure is achieved and a first fuel tank pressure reading is taken. A second fuel tank pressure reading is then taken at the end of the system test period.

Referring again to FIG. 5B, after the test period expires, step 539, the controller stores the differential pressure that occurred during the test. The differential pressure is then evaluated against a controller-generated threshold that is dependent on fuel level and fuel liquid temperature, step 540. There can be multiple thresholds corresponding to different emissions levels of the evaporative emission system. If the differential pressure is greater than the preset threshold, then the system evaporative emissions are deemed to be outside desirable limits. The controller stores this information and the diagnostic test is complete. If the differential pressure does not exceed the predetermined threshold, then system evaporative emissions are deemed to be within desirable limits and the diagnostic test is complete, step 544. The controller is then deactivated, step 546.

In accordance with the preferred methods of the present invention, desirable limits for system evaporative emissions are selected to vary as a function of fuel level, fuel liquid temperature inside the fuel tank, and the selected system test duration. Such limits, for example, are used to define "desirable" versus "undesirable" emissions conditions in accordance with government regulations. The indication of "desirable" or "undesirable" emissions conditions can be made either immediately following the system diagnostic test, or alternatively by saving operating conditions and test results in computer memory for evaluation during a subsequent power-up of the vehicle.

Figure 7A:
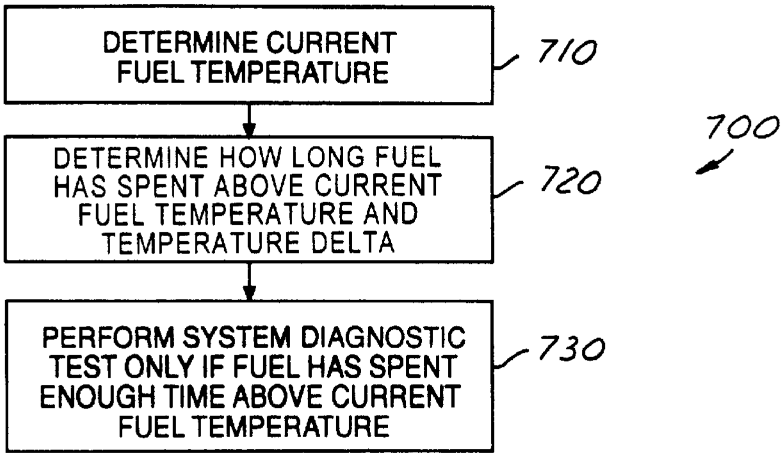
FIG. 7A is a flow diagram of a fuel weathering method in accordance with the present invention.

To further improve the emissions detection capabilities of the present diagnostic system, a "fuel weathering" method is provided as shown in FIG. 7A. "Fuel weathering", which refers to how the evaporative characteristics of fuel inside the vehicle evaporative system change over time, can occur for various reasons, including but not limited to fuel aging, time at a given temperature, agitation and storage in an open versus closed container. By taking into account the fuel's evaporative characteristics, the fuel weathering method of FIG. 7A when combined with the diagnostic method of FIGS. 5A through 5C minimizes noise effects and thus improves the detection capability and completion frequency of the diagnostic test. This is especially important in light of additional regulatory changes emphasizing completion frequency.

Referring again to FIG. 7A, the fuel weathering method disclosed herein includes the steps of: determining the current fuel temperature of the liquid fuel inside the fuel tank, step 710, determining how long the liquid fuel inside the fuel tank has spent above the current fuel liquid temperature, step 720, and performing a system test only if the liquid fuel inside the fuel tank has spent a minimum amount of time above the current fuel liquid temperature, step 730. The fuel weathering method thus improves test accuracy by taking into account that the liquid fuel inside the evaporative emission system is made up of many different constituents each having different boiling points. As the fuel is heated, certain constituents will reach their boiling points first and vaporize. Once in vapor form, the fuel will be purged to the engine or trapped by the charcoal canister to be purged to the engine at a later time, thus effectively removing certain fuel vapors from the evaporative emission system prior to the system diagnostic test. If liquid fuel is heated, then cooled and reheated, less fuel vapor will be produced when the temperature of the liquid fuel is below the maximum liquid fuel temperature achieved during the first heating event.

As such, the fuel weathering method of the present invention is advantageous in that it improves the accuracy of evaporative emission system diagnostic test results by minimizing test-to-test variability within the same tank of fuel. In accordance with the fuel weathering method of FIG. 7A, the controller keeps track of how much time the fuel liquid temperature has spent above various temperatures since the last refueling event. The controller then allows the system diagnostic test to proceed only if the fuel has spent enough time above the current test temperature. This ensures the fuel has been sufficiently "weathered" by insuring that the diagnostic test is not performed until certain constituents of the fuel at the current temperature have already been vaporized at higher temperatures and have been removed from the fuel by the evaporative emission system. The fuel weathering method of FIG. 7A is further advantageous in that it can be used with different types of evaporative emission systems.

Figure 7B:
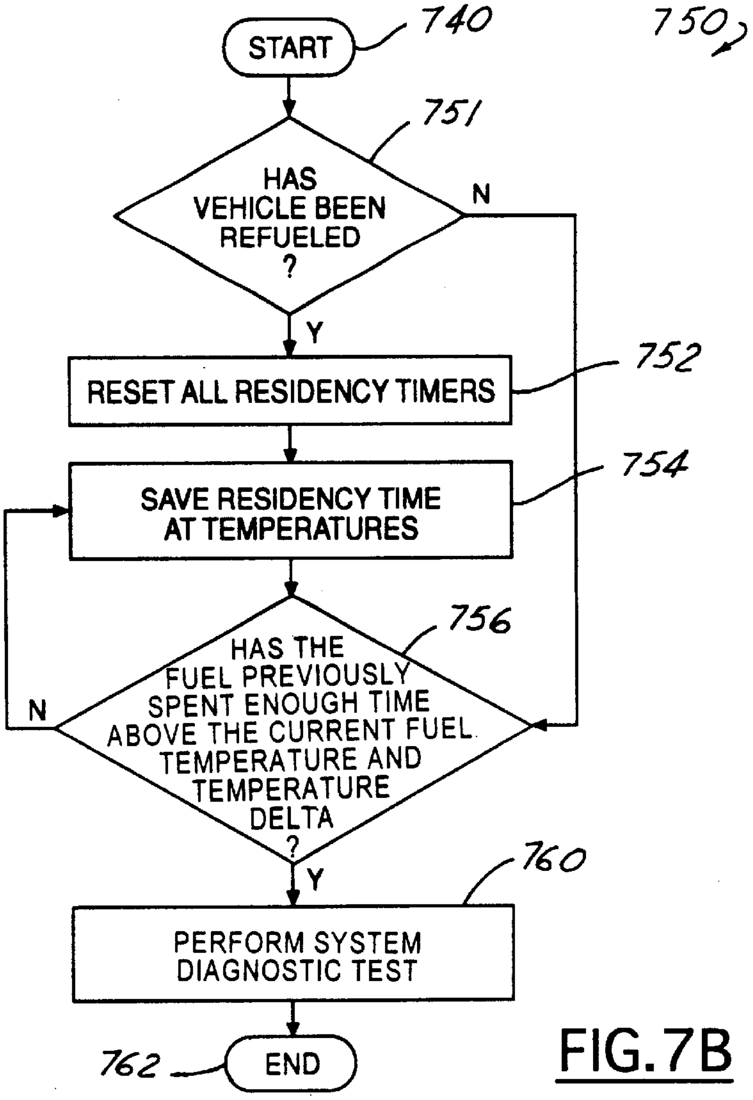
FIG. 7B is a detailed flow diagram of a fuel weathering method using fuel temperature residency timers.

FIG. 7B shows a detailed flow diagram of a fuel weathering method using fuel residency counters. In accordance with step 520 of FIG. 5B, the controller must first determine whether a refueling event has occurred, step 751. This can be done in any suitable manner, including for example by monitoring the position of the fuel tank cap or a sudden increase in fuel level inside the tank. If the controller determines that the vehicle has been refueled, then fuel temperature residency timers associated with the fuel weathering method are reset to a nominal value, step 752. The fuel temperature residency timers, which for example can be stored in the controller's "keep-alive" memory (KAM), are used by the controller to keep track of how much time the liquid fuel presently inside the tank has spent at or above a given temperature.

Table 1 provides examples of various fuel temperature residency times for corresponding predetermined temperature ranges or "bins". Corresponding "bin" residency timers are thus incremented and stored in memory for use in the present method, i.e., any time the current fuel temperature is at or above a given bin temperature, that bin's residency timer is incremented accordingly, step 754. Optionally, each of the predetermined temperature ranges can include an additional bin temperature delta. Table 1 below for example shows bin temperature deltas equal to zero.

TABLE 1

Example of Fuel Temperature Residency Times at Various Temperatures

| | | | | | | |
|---|---|---|---|---|---|---|
| Temperature Bin (Bin Temperature Delta = 0) | 40 | 70 | 80 | 90 | 100 | 110 |
| Residency Time Stored in KAM (minutes) When Current Temp. > = Bin Temp. | 313 | 243 | 221 | 149 | 82 | 46 |

Next, whether or not a fueling event is detected, the controller then determines how much time the fuel in the fuel tank has spent above the current fuel temperature since the last refuel event, step 756. Whether or not the fuel has spent enough time above the current temperature is determined by comparison to minimum fuel temperature times. Preferably, the minimum fuel temperature times are provided by temperature bins and made available to the controller via a lookup table. If the liquid fuel in the tanks has spent enough time above the current temperature, i.e., the corresponding fuel temperature residency timer exceeds the corresponding minimum fuel temperature time, then a system diagnostic test is initiated, step 760. On the other hand, if the fuel has not spent enough time above the current temperature, then the diagnostic test is bypassed until the temperature decreases to a value with sufficient residency time or enough residency time is accumulated above the current fuel liquid temperature.

Figure 8:
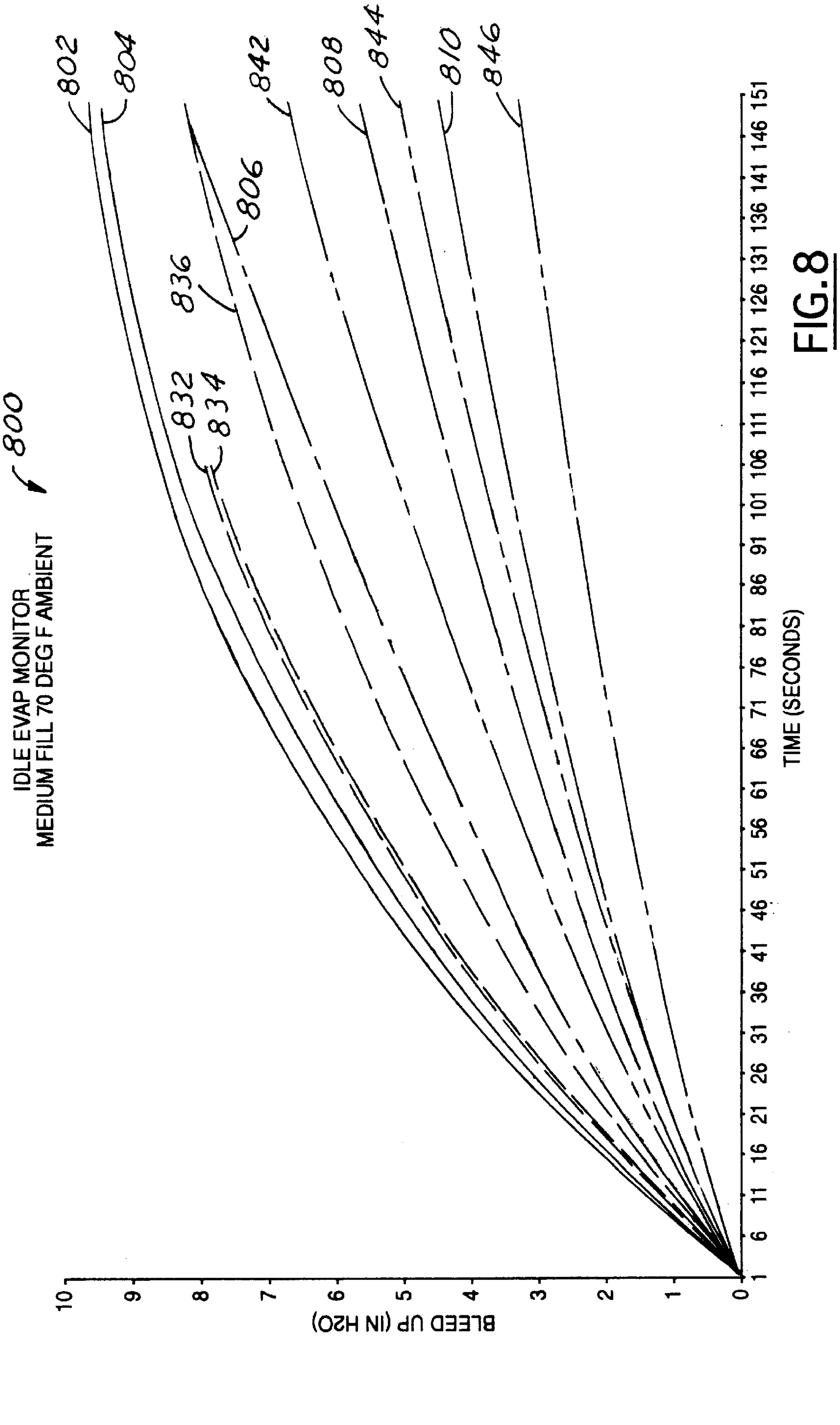
FIG. 8 is diagnostic test data for a conventional idle evaporation monitor.
Figure 9:
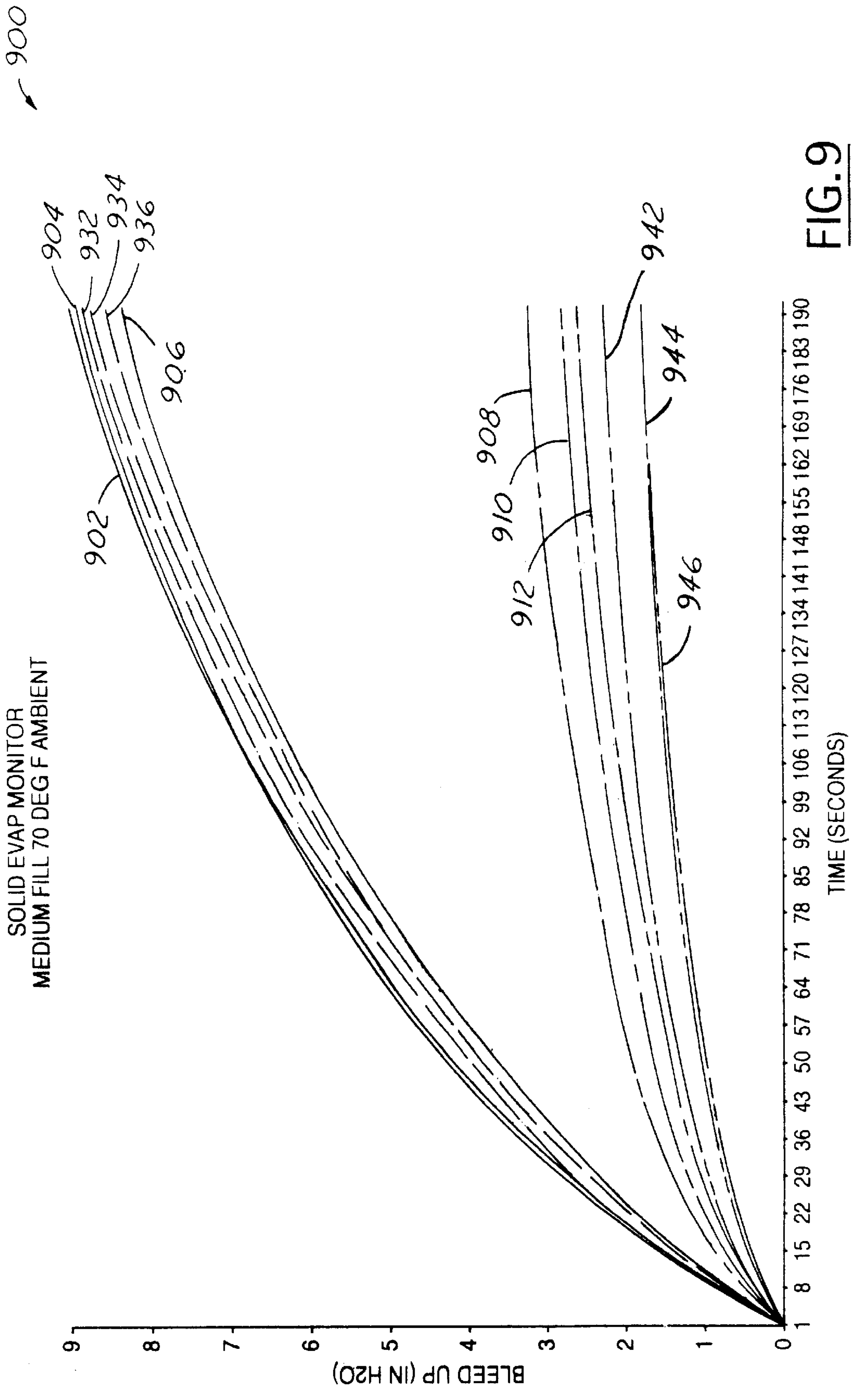
FIG. 9 is diagnostic test data for the evaporative emission system of the present invention.

A performance comparison of the present method/system to a conventional static idle monitor is provided below for conditions specified in OBD II Regulation Mail Out #MSC 97-24 set forth by the California Air Resources Board (CARB). During a typical static idle test, the vehicle is stationary with its engine idling. Exemplary test results are shown in FIGS. 8 and 9. In comparing the performance of the two monitors, it was first necessary to choose appropriate system test duration times over which to evaluate the pressure bleed-ups from both the idle monitor and present system. For the vehicle tested, the idle monitor was calibrated to run a 20 second system diagnostic test over all fuel levels and ambient temperatures due to the limitations of actual idle time duration during vehicle usage. The present system is not subject to these limitations due to its mode of operation. In order to optimize the performance of the test with the present system, test duration times were selected as a function of both ambient temperature and fuel fill level.

In order to optimize the separation of desirable and undesirable emissions conditions as specified by the CARB Mail Out #MSC 97-24, a separation factor (SF) was computed to be the difference of the two sample means divided by the sum of the standard deviations of each sample:

$$SF = \frac{\Delta P_U^{ave} - \Delta P_A^{ave}}{3\sigma_U + 3\sigma_A}$$

Using this empirical formula, a value SF=1 equates to a evaporative emissions detection method in which the mean of the "desirable emissions" data plus a three-sigma deviation (3σ) is equal to the mean of the "undesirable emissions" data minus 3σ, e.g., six-sigma (6σ) separation between the two sample means. Thus, the larger the separation factor, the greater the degree of confidence (6σ) in determining whether an undesirable emissions condition exists.

Exemplary system test duration times (in seconds) are shown below in Table 2. The test durations for the present diagnostic method were selected for three fuel fill levels (High, Medium and Low) and four different ambient temperatures (40° F., 70° F., 100° F. and 110° F.) so as to optimize the SF between the "desirable emissions" data and "undesirable emissions" data.

TABLE 2

Optimized System Test Duration Times

| Fuel Level | System Test Duration (sec) 40° F. Amb. | 70° F. Amb | 100° F. Amb | 110° F. Amb |
|---|---|---|---|---|
| HIGH | 108 | 108 | 50 | 50 |
| MEDIUM | 185 | 185 | 115 | 115 |
| LOW | 185 | 185 | 185 | 185 |

Exemplary separation factors for "medium" fuel fill levels at 70° F. ambient are provided below in Table 3 corresponding to "desirable emissions" (DES) and "undesirable emissions" (UNDES) data in accordance with the CARB Mail Out #MSC 97-24.

TABLE 3

Comparison of Separation Factors & Other Statistics

| Statistic | Conventional Diagnostic (Static Idle) System | Present Diagnostic System |
|---|---|---|
| DES Mean | 1.192 | 1.988 |
| DES 3 Std. Dev. | 0.979 | 0.926 |
| UNDES Mean | 2.771 | 8.563 |
| UNDES 3* Std. Dev. | 2.142 | 0.417 |
| Separation Factor | 0.506 | 4.898 |

FIGS. 8 and 9 show diagnostic test data for a conventional static idle evaporation monitor and the evaporative emission system of the present invention, respectively (medium fill, 70 degrees F. ambient). Each graph shows plots of bleed-up in inches of water versus time in seconds for each of the following scenarios: (1) "undesirable emissions"; (2) "undesirable emissions", weathered fuel; (3) "desirable emissions"; and (4) "desirable emissions", weathered fuel. For weathered fuel scenarios, the fuel weathering method described above was used.

FIG. 8 shows that in the case of the conventional idle evaporation monitor, indication of a true "undesirable emissions" condition is less reliable than for the diagnostic system of the present invention. In contrast, FIG. 9 shows improved separation between true "undesirable emissions" conditions and "desirable emissions" conditions.

In summary, a diagnostic method and system monitoring hydrocarbon emissions from a vehicle evaporative emission system has been described that provides reliable and repeatable detection of low-level evaporative emissions levels by minimizing the dynamic effects of fuel slosh, barometric (grade) pressure and environmental heating. The diagnostic method of the present invention can be run over an extended period of time and is limited only by the extent of the peak vacuum level stored inside the evaporative emission system.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method of monitoring evaporative emissions of a vehicle having an evaporative emission system, comprising:

establishing a baseline pressure within the evaporative emission system during a vehicle-off condition;

detecting a change in the baseline pressure during the vehicle-off condition; and indicating whether the change in the baseline pressure is within a desirable limit.

2. A diagnostic method of monitoring an evaporative emission system of a motor vehicle, comprising:

establishing a baseline vapor pressure inside the system during a vehicle-off condition;

detecting a change in the baseline vapor pressure during the vehicle-off condition; and indicating whether the change in the baseline vapor pressure is within a desirable limit.

3. The method according to claim 2, wherein said step of establishing a baseline pressure within the evaporative emission system comprises:

storing a vacuum within the evaporative emission system; and isolating said vacuum from atmospheric conditions.

4. The method according to claim 2, further comprising the step of verifying whether system test conditions are within predetermined limits prior to performance of said detecting step.

5. The method according to claim 4, wherein said step of verifying the system test conditions comprises determining whether the vehicle has been in the vehicle-off condition for a sufficient amount of time prior to said detecting step.

6. The method according to claim 4, wherein said step of verifying the system test conditions comprises determining whether the temperature of fuel inside said evaporative emission system is within a predetermined fuel temperature limit.

7. The method according to claim 4, wherein said step of verifying the system test conditions comprises determining whether the level of fuel inside said evaporative emission system is within a predetermined fuel level limit.

8. The method according to claim 4, wherein said step of verifying the system test conditions comprises determining whether fuel inside the evaporative emission system has sufficiently vaporized prior to said detecting step.

9. A system for monitoring evaporative emissions of a vehicle having an evaporative emission system, comprising:

a sensor for monitoring a baseline vapor pressure of the evaporative emission system and subsequent changes thereto occurring during a vehicle-off condition; and a controller activateable during the vehicle-off condition and coupled to the evaporative emission system and said sensor for indicating whether the change in the baseline vapor pressure occurring during the vehicle-off condition is within a desirable limit.

10. The system according to claim 9, wherein the evaporative emission system comprises:

a fuel tank;

an evaporative emission canister;

a vacuum reservoir;

an engine manifold; and one or more valves coupled to said fuel tank, said canister and said engine manifold, said valves being electronically controllable by said controller.

11. The system according to claim 10, wherein said vacuum reservoir is molded into said fuel tank.

12. The system according to claim 10, wherein said evaporative emission canister and vacuum reservoir are combined into a single assembly.

13. The system according to claim 10, further comprising a sensor for monitoring a fuel level inside said fuel tank.

14. The system according to claim 10, further comprising a sensor for monitoring fuel temperature inside said fuel tank.

15. The system according to claim 9, further comprising controller activation means for powering the controller during the vehicle-off condition.

16. The system according to claim 9, further comprising valve control means for establishing a baseline pressure within the system prior to the occurrence of a vehicle-off condition.

17. An article of manufacture for monitoring evaporative emissions of a vehicle having an evaporative emission system, comprising:

a computer usable medium; and a computer readable program code embodied in the computer usable medium for directing a computer to control the steps of establishing a baseline pressure within the system during a vehicle-off condition, detecting a change in the baseline pressure during the vehicle-off condition, and indicating whether the change in the baseline pressure is within a desirable limit.

* * * * *